United States Patent
Cepulis

(10) Patent No.: US 6,961,791 B2
(45) Date of Patent: Nov. 1, 2005

(54) METHOD FOR EXPANSION AND INTEGRATION OF OPTION ROM SUPPORT UTILITIES FOR RUN-TIME/BOOT-TIME USAGE

(75) Inventor: Darren J. Cepulis, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 419 days.

(21) Appl. No.: 09/981,202

(22) Filed: Oct. 17, 2001

(65) Prior Publication Data

US 2003/0074491 A1 Apr. 17, 2003

(51) Int. Cl.[7] .............................................. G06F 13/00
(52) U.S. Cl. .............................. 710/104; 710/2; 710/10; 713/2
(58) Field of Search .............................. 713/2; 710/104, 710/2, 10

(56) References Cited

U.S. PATENT DOCUMENTS

| | | | |
|---|---|---|---|
| 6,317,828 B1 * | 11/2001 | Nunn | 713/2 |
| 6,356,965 B1 * | 3/2002 | Broyles et al. | 710/104 |
| 6,513,114 B1 * | 1/2003 | Wu et al. | 713/2 |
| 2003/0051114 A1 * | 3/2003 | Natu | 711/165 |
| 2003/0083761 A1 * | 5/2003 | Jacobs et al. | 700/94 |
| 2003/0097581 A1 * | 5/2003 | Zimmer | 713/200 |

OTHER PUBLICATIONS

BIOS Boot Specification Version 1.01, Jan. 11, 1996.*

* cited by examiner

Primary Examiner—Jeffrey Gaffin
Assistant Examiner—Justin Knapp

(57) ABSTRACT

A computer system has a centralized configuration control point. Preferably, this control point is a ROM-based setup utility ("RBSU") which permits various aspects of the computer system to configured such as system passwords, serial ports, parallel ports, and the like. The RBSU also permits an operator to configure various option device and subsystems, such as PCI devices. When such an option device is selected to be configured, the RBSU code searches option ROM space for one or more predefined signature values. Such a signature, which preferably comprises an eight byte value, signifies the beginning of a table of information which the RBSU code uses to determine the location of the beginning of the option ROM routine through which the corresponding option device can be configured. Once the option device is configured, control returns to the RBSU code. In this way, the operator can configure the computer system and the option devices from a single software control system.

15 Claims, 2 Drawing Sheets

| VALUES | DESCRIPTION | LOCATION |
|---|---|---|
| $,O,R,C,_,E,N,T | 8 BYTE SIGNATURE TO SIGNIFY TABLE START | ANY PARAGRAPH BOUNDARY IN DCH (C800h–DFFFFh) |
| DW xxxxh (FILLED IN BY OPTION ROM DURING POST OPTION ROM INITIALIZATION) | 16 BIT OFFSET OF OPTION ROM CONFIGURATION ENTRY POINT | SIGNATURE OFFSET+8 |
| DW xxxxh (FILLED IN BY OPTION ROM DURING POST OPTION ROM INITIALIZATION) | 16 BIT SEGMENT OF OPTION ROM–A VALUE OF 0000h MEANS ENTRY POINT NOT SUPPORTED | SIGNATURE OFFSET+10 |
| DW 0001h | CURRENT REVISION | SIGNATURE OFFSET+12 |
| DW 0000h | RESERVED/UNUSED | SIGNATURE OFFSET+14 |
| DD xxxxxxxxh | PCI SUBSYSTEM VENDOR/DEVICE ID | SIGNATURE OFFSET+16 |
| DD yyyyyyyyh | SUBSYSTEM VENDOR/DEVICE ID MASK | SIGNATURE OFFSET+20 |

FIG.3

METHOD FOR EXPANSION AND INTEGRATION OF OPTION ROM SUPPORT UTILITIES FOR RUN-TIME/BOOT-TIME USAGE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to configuring a computer system. More particularly, the present invention relates to configuring add-in cards and devices using a centralized, integrated configuration process.

2. Background of the Invention

When a user turns on a computer for the first time, the computer typically performs a setup routine. The purpose of the setup routine is to configure the computer to the particularities or preferences of the user. For example, the setup routine is used, in the context of a server, to specify the amount of system memory, size of the hard drive, number and type of processors, etc. and, in the context of a personal computer, to specify the type of keyboard (U.S., European, etc.) that has been connected to the chassis, the type of monitor, the type of modem, amount of system memory, configure the interrupts, setup the input/output ("I/O") ports, and set various other parameters. Further, the setup routine can be re-run during a subsequent boot up, or other event, by pressing a predefined key or key sequence such as <F10> during the boot process to change or verify the configuration of the computer system.

The setup routine of early personal computers was implemented as an executable file stored on a floppy disk or hard disk drive. Specifically, disk-based setup was stored in an "inactive" partition on the hard disk. An inactive partition is a portion of the disk drive that is generally inaccessible to the user during normal operation, but can be accessed by invoking a particular procedure such as pressing <F10> during boot up as noted above. The inactive partition also has been referred to as a "hidden" partition to denote its generally inaccessible nature. Many computer users did not favor the use of hidden partitions, particularly hidden partition for storing the setup routine. These users were concerned about not having full control over the hidden partition, as they had with the active partitions.

An additional concern that users had with disk-based setup was the amount of disk space the setup routine occupied. The setup routine occupied disk space that otherwise could have been used for storing data and applications. Initially, disk-based setup routines occupied about 4 megabytes ("MB"), but recently setup routines have grown to occupy upwards of 20 MB of disk space. Although hard drive capacity also has grown, it still is desirable to free up as much space as possible for data and applications.

At least some computer manufacturers have replaced the hard disk implementation for setup with a ROM-based setup ("RBSU"). A "ROM" is a Read Only Memory device that has the capacity to store a certain number of bytes of data or executable code. Although the storage capacity varies from ROM to ROM, ROM devices typically are capable of storing much less information than hard disks or other types of fixed drives (e.g., CD ROMs).

Most personal computers include at least one ROM device referred to as the "BIOS ROM" or "system ROM." BIOS stands for Basic Input/Output System and refers to a set of executable routines that the computer's microprocessor can execute to provide low level control over various input/output devices such as hard disk drives, CD ROM drives, keyboards, mouse, and floppy disk drives. The BIOS code generally is permanently stored in the system ROM.

The system ROM also contains initialization routines that are executed to boot the computer. The microprocessor executes these initialization routines which test and initialize system memory and various other devices in the computer system. When the boot up process begins, the microprocessor executes the initialization routines directly from the system ROM. That is, each instruction is fetched from the ROM and provided to the microprocessor for execution. In the latter stages of the boot process, after the system memory is initialized, the BIOS routines are copied to the main system memory ("RAM") and are executed from system memory, instead of from the system ROM.

Once invoked, the RBSU configuration routine generally requires interaction between the user and the computer. The user, for example, may be prompted to configure serial and/or parallel ports, system passwords, recovery options, and the like. In addition, some types of computers, such as servers, have add-in cards such as system management cards (which provide system configuration, power management, etc.) that couple to the host system and that also must be configured. In conventional legacy systems, RBSU is not used to configure such other devices or cards. Instead, before or after running RBSU, the operator activates the configuration routine programmed into the add-in cards via whatever mechanism is provided for doing so for that particular card. Each card may have a unique way to activate the configuration routine provided thereon which, for obvious reasons, places an administrative burden on the operator. Further, such configuration entry methods typically require the operator to press a certain key or key sequence during the boot process. If, after configuring a card, the operator desires to change some aspect of the card's configuration, the operator disadvantageously must reboot the entire system.

Accordingly, an easier and more efficient mechanism to configure a computer and its add-in cards and devices is needed.

BRIEF SUMMARY OF THE INVENTION

The problems noted above are solved by a computer system having a centralized configuration control point. Preferably, this control point is a ROM-based setup utility ("RBSU") which permits various aspects of the computer system to configured such as system passwords, serial ports, parallel ports, and the like. The RBSU also permits an operator to configure various option device and subsystems, such as PCI devices. When such an option device is selected to be configured, the RBSU code searches option ROM space for one or more predefined signature values. Such a signature, which preferably comprises an eight byte value, signifies the beginning of a table of information which the RBSU code uses to determine the location of the beginning of the option ROM routine through which the corresponding option device can be configured. Once the option device is configured, control returns to the RBSU code. In this way, the operator can configure the computer system and the option devices from a single software control system.

Further, each option device preferably has an option ROM entry table that permits the RBSU code to run the option ROM code. Each table preferably includes values that are used to determine or calculate the starting address for the option ROM code, as well as device-specific information.

BRIEF DESCRIPTION OF THE DRAWINGS

For a detailed description of the preferred embodiments of the invention, reference will now be made to the accompanying drawings in which:

FIG. 3 shows an exemplary ROM configuration entry table used to provide option ROM entry information.

NOTATION AND NOMENCLATURE

Certain terms are used throughout the following description and claims to refer to particular system components. As one skilled in the art will appreciate, computer companies may refer to a given component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device "couples" to a second device, that connection may be through a direct electrical connection, or through an indirect electrical connection via other devices and connections. The term "configure" or "configuration" is intended to refer to initially configuring a device, as well as reconfiguring the device during a subsequent point in time. To the extent that any term is not specially defined in this specification, the intent is that the term is to be given its plain and ordinary meaning.

DETAILED DESCRIPTION OF THE PREFERRED EMBODIMENTS

The problems noted above are solved by providing a ROM-based setup utility ("RBSU") that, not only provides conventional system configuration and setup capabilities, but also provides a mechanism to access the configuration routines of various add-in cards or devices. Thus, the operator is provided with a single control point through which the system and ancillary devices can be configured. This concept will be described in greater detail below with regard to FIGS. 1–3.

Figure 1:
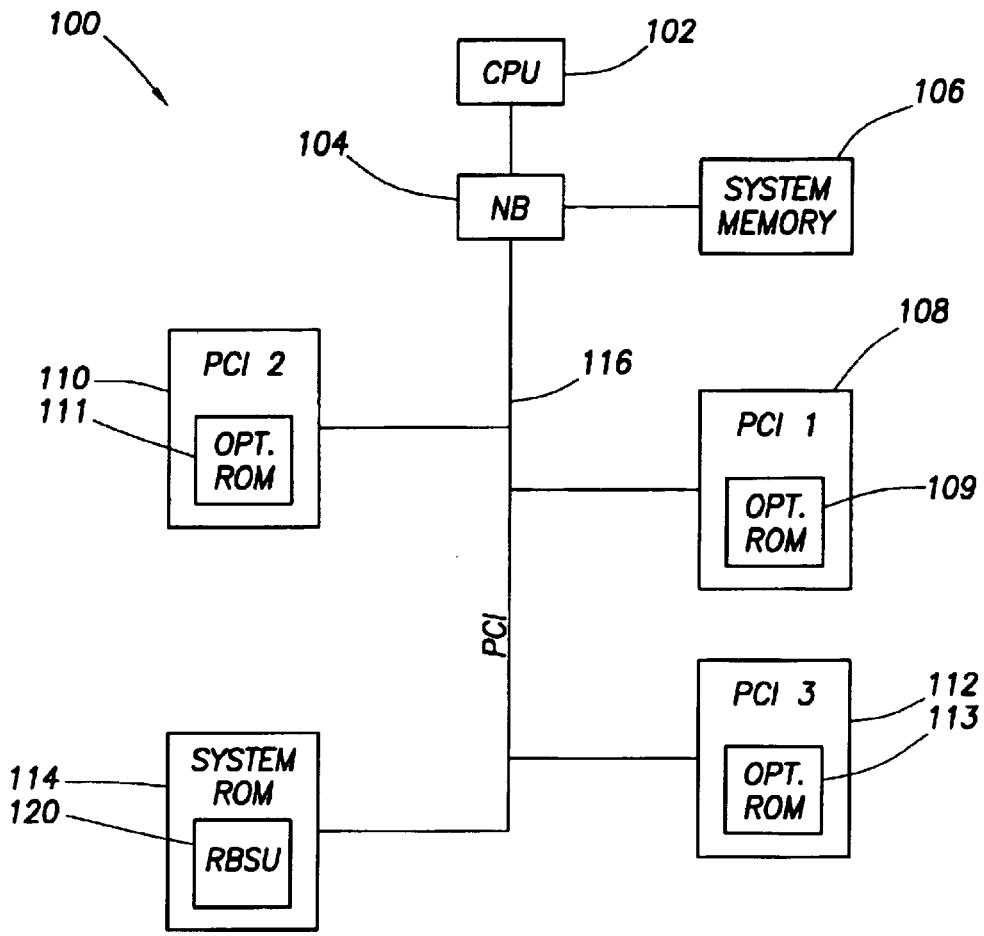
FIG. 1 depicts a block diagram of a system constructed in accordance with the preferred embodiment.

Referring to FIG. 1, computer system 100 may be a server or other type of computer. As shown, computer system 100 preferably includes one or more central processing units 102, a north bridge device 104, system memory 106, and various devices 108, 110, 112 and 114 coupled to the bridge 104 over a common bus 116. The bus may comprise a peripheral component interconnect ("PCI") bus and, as such, devices 108–114 are PCI-compliant. Alternatively, bus 116 ma be in accordance with other bus standards and devices 108–114 would be compliant with whatever standard is used for the implementation of bus 116. The PCI devices 108–112 may be whatever type of devices are desired, such as management cards, modems, network interface cards ("NICs"), and the like. In general, these devices are referred to as "option devices" which is a term intended to refer to an add-in card, embedded logic on a system board, or any other type of embodiment that provides any type of peripheral functionality. An option device may or may not require configuration and permit reconfiguration. The preferred embodiment of the invention, however, is useful in connection with those option devices that permit or require configuration.

The north bridge 104 performs a number of functions. For instance, bridge 104 may include a memory controller function that permits the CPU 102 and the PCI device 108–114 to access the system memory 106. The system memory preferably comprises any suitable type of random access memory ("RAM") such as synchronous dynamic random access memory ("SDRAM"). The north bridge 104 also provides a mechanism through with the CPU 102 can access and control one or more of the PCI devices 108–114.

As shown in FIG. 1, one of the PCI devices 114 is a system ROM. This ROM preferably includes various executable routines and information that are used for several purposes. These routines can be executed out of the ROM 114 itself or copied to system memory 106 for execution therefrom. One such purpose is to provide the CPU 102 the ability to control various low level activities such as access to the hard disk drives, CD ROM drives, keyboards, mouse, and floppy disk drives (not shown).

In addition, an RBSU 120 is stored on system ROM 120. In accordance with the preferred embodiment of the invention, the RBSU provides two principle functions. The first function is similar to that of conventional RBSU routines which is to permit an operator to configure or reconfigure one or more aspects of the system 100 such as one or more of the following non-exhaustive aspects: serial and/or parallel ports, selection of interrupts for the PCI devices, selection of a PCI device to be a boot controller, system passwords and recovery operations.

The second basic function performed by RBSU 120 is to provide a centralized mechanism to permit entry into an option device's configuration routines. Accordingly, when an operator desires to configure an option device, the operator chooses the device to configure through the RBSU routine. The choice can be implemented by way of a selectable menu of option devices to configure or through any other suitable mechanism embodied in the RBSU code. Once an operator uses RBSU to select an option device, the RBSU routine locates and executes the operator-selected option ROM routine. Then, when the option ROM routines is completed, control returns to RBSU permitting the operator to select the same or another option device to configure or quit RBSU altogether.

Figure 2:
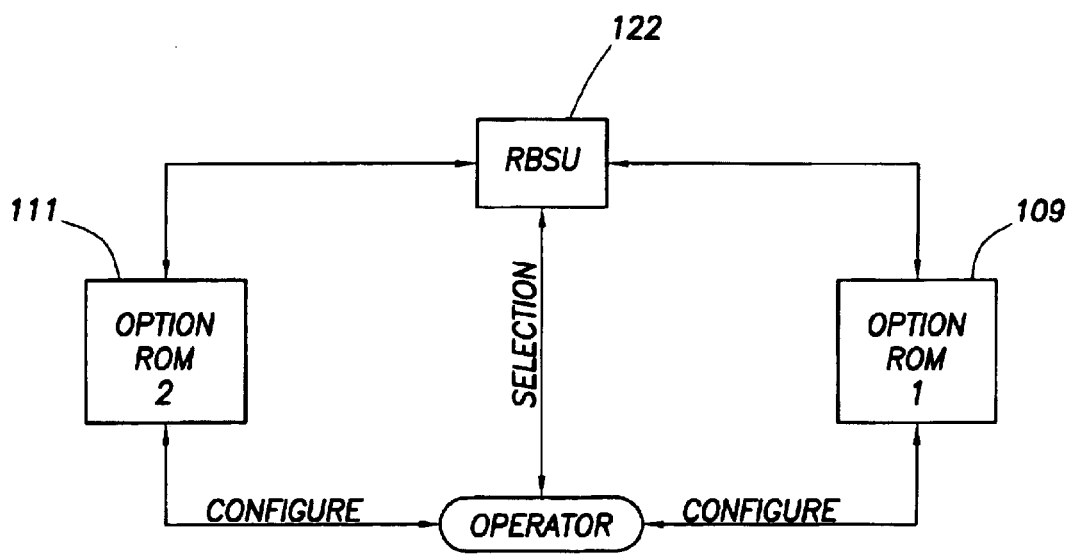
FIG. 2 shows conceptually the operational inter-relationship between the ROM-based set up utility and the configuration routines of various optional devices.

This process is illustrated conceptually in FIG. 2. As shown, from RBSU 122, control can pass to an option ROM, such as option ROM routine 109 or 111, and then back to the RBSU utility. The operator selection is through the RBSU 122 as shown. Once an option ROM utility is invoked, of course, the operator may be prompted by such utility program for various configuration information, denoted as the "configure" arrows in FIG. 2.

Any one of a variety of ways for the RBSU to cause an option ROM configuration routine to be executed is acceptable. For example, a configuration routine called by or part of RBSU searches for the option ROM routine corresponding to the device or subsystem selected by the operator to be configured. In accordance with the preferred embodiment, an option ROM configuration entry table is associated with each configurable device (e.g., PCI devices 108–112). This table preferably is stored in option ROM memory at a 16 byte boundary in the option ROM space and provides information regarding the location in memory of the option ROM configuration utility that can be executed to configure the device. A suitable option ROM entry table 200 is shown in FIG. 3.

As shown in FIG. 3, table 200 includes a plurality of entries 202–214. The first entry 202 includes a "signature" which permits such a table to be scanned for and found in memory. That is, the RBSU utility that searches for a desired option ROM configuration utility identifies the existence of the tables 200 by looking for the signatures. Preferably, each configuration entry table includes the same signature, or different, but predetermined, signatures can be used for the various tables. In accordance with one preferred embodiment the signature comprises the eight byte ASCII character string "$ORC_ENT" (which generally stands for "Option ROM Configuration Entry").

The next pair of entries are each preferably 16 bit values that provide the offset (entry 204) and segment (entry 206) of the location of the beginning of the option ROM configuration utility program which permits the option device to be configured. Preferably, a "far" call is made to the location specified by the segment and offset to begin execution of the option ROM utility. To return to the RBSU utility that made the "far" call, the option ROM utility preferably does a "far" return in accordance with conventional techniques. Entry 208 includes the current revision identifier for the option ROM configuration utility. Entry 210 generally is unused, but can be used as desired.

Referring still to FIG. 3, the RBSU configuration utility preferably passes, in the case of a PCI configurable device, the PCI BUS/DEVICE/FCN # in a suitable CPU 102 register, such as the BX register (not specifically shown in FIG. 1). This is generally the same technique as calling PCI BIOS routines as is well understood by those of ordinary skill in the art. Entry 212 includes device-specific information regarding the device that corresponds to the table 200. The entry 212 includes, as shown in FIG. 3, a PCI subsystem vendor/device identifier. The RBSU utility that searches the configuration entry tables 200 uses the PCI BUS/DEVICE/FCN # to scan entries 212 to determine which of the tables 200 (assuming there is more than one) pertains to the particular device that the operator wishes to configure. Additionally, to allow for multiple similar devices to be supported with one option ROM configuration utility, a mask field (entry 214) is provided. The mask field specifies which part of the subsystem identifier values in entry 212 should be used to compare the device specific identifier information in the far call to the values in entry 212. Alternatively, of course, an option ROM can include multiple option ROM configuration entry tables 200, each preferably located on a paragraph boundary.

As explained above, the RBSU configuration utility that searches for an option ROM utility to execute performs a far call to initiate this process. The entry parameters for this process include the PCI BUS/DEVICE/FCN # placed in the BX or other suitable register in the CPU 102. This information is used to point to a PCI device with a matching subsystem vendor/device ID as specified in entry 212 of tables 200. After the option ROM code has executed, the option ROM code preferably sets or otherwise returns several parameters that the RBSU code uses. A register, such as the AX register can be used for this purpose. One such return parameter is an indication of whether the option ROM code has selected a new device to be the primary boot device for the computer, and if so, which device is now the primary boot device. For example, bit 0 of the AX register can be set to a value of "1" to indicate that the option device has configured itself or one of its drives (if it has drives) to be the primary boot device. This information permits the system configuration utility to automatically update any system specific controller order configuration information based on what the user selects in the option ROM. If the option device does not change the primary boot device, then bit 0 of register AX is set to a value of "0." Additionally, if desired, bit 1 of the AX register can be used by the option ROM code to indicate to the system whether the system must be rebooted for the whatever changes were made during execution of the option ROM code to take effect. Setting the AX register bit 1 to a value of 1 can be used to indicate this information the system ROM. If rebooting the system is not necessary, the AX register bit 1 is set to a value of "0." If no other bits in the AX register are needed to provide return information, all other bits of the AX register may be set to a value of "0" on return.

As an alternative or additional feature, the present invention may permit multiple executable images to be maintained for each option device. One image could be as described above. Other images could Real mode configuration ROM images, diagnostic utilities, system partition applications or drives, and the like. The system ROM could be programmed to automatically detect and download these images during power on self test ("POST") and store them off either in reserved space at the top of memory for later use by a ROM based configuration utility or run-time utility or in the case of system partition images, automatically copy them out to the system partition for later use during the boot or configuration process. These latter images preferably include a header table similar to that described above to give entry point information and applicable device information for the image.

Thus, as described herein, a method and apparatus permits the operator to configure the main computer system and various option devices via a centralized control point (i.e., the RBSU routine). In this way, the computer is much easier to configure than in conventional computer systems.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a CPU;
   system memory coupled to said CPU;
   a system ROM containing system ROM code executable by said CPU;
   an option device coupled to said CPU; and
   option ROM code associated with said option device and usable by an operator to configure the option device;
   wherein said system ROM code permits an operator to execute said option ROM code and wherein said system ROM code searches for a predefined signature value when an operator selects an option ROM code to execute, said signature value identifies information pertaining to the option ROM code, said information includes an option device identification value and an indication of the location of the option ROM code.

2. The computer system of claim 1 wherein said option ROM code is resident on said option device.

3. The computer system of claim 2 wherein said option ROM code is copied to and executed from system memory.

4. The computer system of claim 1 wherein said signature corresponds to an option ROM configuration entry table, said table includes location values regarding the location of the option ROM code and a device identifier value.

5. The computer system of claim 4 wherein said table further includes a mask value that permits multiple types of option devices to use the option ROM code pertaining to a single table.

6. A method of configuring a computer system, comprising:
configuring one or more aspects of a computer system using system ROM code;
permitting an operator to select an option device coupled to said computer system to be configured using said system ROM code; and
searching for an option ROM code associated with said option device using said system ROM code; and
executing said option ROM code;
wherein searching for an option ROM code includes searching for a predefined value that indicates the location of a set of information, said set of information includes an identification value that identifies the option device and a location value that is used to determine the location of the option ROM code; and
wherein said set of information also includes a device identifier and wherein searching for an option ROM code further includes comparing a device identifier associated with the option device the operator wishes to configure to the device identifier in the set of information.

7. The method of claim 6 wherein executing said option ROM includes transferring execution to said location if the device identifiers match.

8. The method of claim 6 further including returning to said system ROM code after said option ROM code completes executing.

9. A system ROM including computer executable system ROM code that includes instructions which comprise:
an instruction that permits an operator to configure a computer system; and
an instruction that permits an operator to configure one or more option devices within the computer system and to search for an option ROM configuration table corresponding to the option device the operator selects to configure, wherein the search for the option ROM configuration table comprises a search for a signature associated with information, said information comprises an identifier of the option device and a value that indicates the location of option ROM code that is usable by an operator to change the configuration of the option device.

10. The system ROM of claim 9 further including an instruction which causes an option ROM code associated with an option device to be executed.

11. The system ROM of claim 10 wherein said option ROM code is resident on said option device.

12. The system ROM of claim 11 wherein said option ROM code is copied to and executed from RAM memory in said computer system.

13. The system ROM of claim 9 wherein said table includes offset and segment values to the beginning of an option ROM code associated with said option device.

14. The system ROM of claim 13 wherein said table further includes said option device identifier.

15. The system ROM of claim 14 further including an instruction which compares a device identifier obtained from the operator's selection of a device to be configured to the device identifier in said table.

* * * * *